(12) United States Patent
Przygienda et al.

(10) Patent No.: US 10,848,416 B2
(45) Date of Patent: Nov. 24, 2020

(54) REDUCED CONFIGURATION FOR MULTI-STAGE NETWORK FABRICS

(71) Applicant: Juniper Networks, Inc., Sunnyvale, CA (US)

(72) Inventors: Antoni B Przygienda, Sunnyvale, CA (US); Alia K. Atlas, Arlington, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 154 days.

(21) Appl. No.: 16/015,724

(22) Filed: Jun. 22, 2018

(65) Prior Publication Data

US 2019/0116116 A1    Apr. 18, 2019

Related U.S. Application Data

(60) Provisional application No. 62/625,452, filed on Feb. 2, 2018, provisional application No. 62/573,495, filed on Oct. 17, 2017.

(51) Int. Cl.
| | | |
|---|---|---|
| *H04L 12/753* | (2013.01) | |
| *H04L 12/24* | (2006.01) | |
| *H04L 12/751* | (2013.01) | |
| *H04L 29/08* | (2006.01) | |

(52) U.S. Cl.
CPC ............ *H04L 45/48* (2013.01); *H04L 41/12* (2013.01); *H04L 45/02* (2013.01); *H04L 67/10* (2013.01)

(58) Field of Classification Search
CPC ......... H04L 45/48; H04L 45/02; H04L 41/12; H04L 67/10; H04L 47/10; H04L 41/0803
See application file for complete search history.

(56) References Cited

U.S. PATENT DOCUMENTS

| | | |
|---|---|---|
| 7,366,111 B2 | 4/2008 | Thubert et al. |
| 7,720,010 B2 | 5/2010 | Ribiere et al. |
| 9,008,092 B2 | 4/2015 | Thubert et al. |
| 10,027,576 B2 | 7/2018 | Thomas et al. |
| 10,187,290 B2 | 1/2019 | Lin et al. |
| 2006/0227724 A1 | 10/2006 | Thubert et al. |

(Continued)

FOREIGN PATENT DOCUMENTS

WO    2013184846 A1    12/2013

OTHER PUBLICATIONS

Extended Search Report from counterpart European Application No. 18191690.9, dated Feb. 25, 2019, 10 pp.

(Continued)

*Primary Examiner* — Jae Y Lee
(74) *Attorney, Agent, or Firm* — Shumaker & Sieffert, P.A.

(57) ABSTRACT

A method includes receiving, by a first network device, messages from a plurality of network devices in a network, each of the messages indicating a level value of a respective sending network device in a network topology, determining, by the first network device and based on the respective levels indicated by the messages, a level value of the first network device in the network topology, determining, by the first network device and based on the determined level value, a mechanism by which to forward network traffic to one or more of the plurality of network devices, and forwarding the network traffic according to the determined mechanism.

15 Claims, 6 Drawing Sheets

(56) References Cited

U.S. PATENT DOCUMENTS

| | | | |
|---|---|---|---|
| 2011/0116389 A1* | 5/2011 | Tao | H04L 45/18 370/252 |
| 2014/0105029 A1* | 4/2014 | Jain | H04L 43/0811 370/242 |
| 2017/0099218 A1 | 4/2017 | Holcombe et al. | |

OTHER PUBLICATIONS

Gnawali et al., "The Minimum Rank with Hysteresis Objective Function," RFC 6719, Internet Engineering Task Force (IETF), Sep. 2012, 13 pp.

Przygienda et al., "RIFT: Routing in Fat Trees, draft-przygienda-rift-01," Networking Working Group, Internet Draft, Jan. 24, 2017, 39 pp.

"Interior Gateway Protocol," Wikipedia, the Free Encyclopedia, retrieved from https://en.wikipedia.org/wiki/Interior_gateway_protocol, Jan. 7, 2004, 2 pp.

"Exterior Gateway Protocol," Wikipedia, the Free Encyclopedia, retrieved from https://en.wikipedia.org/wiki/Exterior_gateway_protocol, Apr. 13, 2005, 1 pp.

"IS-IS," Wikipedia, the Free Encyclopedia, retrieved from https://en.wikipedia.org/wiki/IS-IS, Nov. 27, 2003, 4 pp.

Bellman, "On a Routing Problem," Quarterly of Applied Mathematics, vol. 16, No. 1, Apr. 1958, pp. 87-90.

Dijkstra et al., "A Note on Two Problems in Connexion with Graphs," Journal of Numerical Mathematics, vol. 1, No. 1, Dec. 1959, pp. 269-271.

Al-Fares et al., "A Scalable, Commodity Data Center Network Architecture," SIGCOMM'08, Aug. 17-22, 2008, pp. 63-74.

Leiserson et al., "Fat Trees: Universal Networks for Hardware-Efficient Supercomputing," IEEE Transactions on Computers, vol. c-34, No. 10, Oct. 1985, pp. 892-901.

Yuan, "On Nonblocking Folded-Clos Networks in Computer Communication Environments," 2011 IEEE International Parallel & Distributed Processing Symposium, May 16-20, 2011, 9 pp.

Farrel et al., "A Path Computation Element (PCE)-Based Architecture," RFC 4655, Network Working Group, Aug. 2006, 40 pp.

Iyengar et al., "QUIC: A UDP-Based Multiplexed and Secure Transport, draft-ietf-quit-transport-00," QUIC Internet-Draft, Nov. 28, 2016, 45 pp.

Oran et al., "OSI ISIS Intra-domain Routing Protocol," RFC 1142, Network Working Group, Feb. 1990, 157 pp.

Bradner et al., "Key words for use in RFCs to Indicate Requirement Levels," RFC 2119, Network Working Group, Mar. 1997, 3 pp.

Moy, "OSPF Version 2," RFC 2328, Network Working Group, Apr. 1998, 244 pp.

Przygienda et al., "M-ISIS: Multi Topology (MT) Routing in Intermediate System to Intermediate Systems (IS-ISs)," RFC 5120, Network Working Group, Feb. 2008, 14 pp.

Katz et al., "Three-Way Handshake for IS-IS Point-to-Point Adjacencies," RFC 5303, Network Working Group, Oct. 2008, 11 pp.

Shen et al., "Point-to-Point Operation over LAN in Link State Routing Protocols," RFC 5309, Network Working Group, Oct. 2008, 10 pp.

Eastlake et al., "US Secure Hash Algorithms (SHA and SHA-based HMAC and HKDF)," RFC 6234, Internet Engineering Task Force (IETF), May 2011, 127 pp.

Previdi et al., "IS-IS Multi-Instance," RFC 6822, Internet Engineering Task Force (IETF), Dec. 2012, 14 pp.

Previdi et al., "Source Packet Routing in Networking (SPRING) Problem Statement and Requirements," RFC 7855, Internet Engineering Task Force (IETF), May 2006, 19 pp.

Lapukhov et al., "Use of BGP for Routing in Large-Scale Data Centers," RFC 7938, Aug. 2016, 35 pp.

Response filed Oct. 21, 2019 to the Extended Search Report from counterpart European Application No. 18191690.9, dated Feb. 25, 2019, 12 pp.

Moy, J. "OSPF Version 2" Network Working Group, RFC 2328, The Internet Society, Apr. 1998, 244 pp.

Oran, David ed. "OSI ISIS Intradomain Routing Protocol" Network Working Group, RFC 1142, Feb. 1990, 157 pp.

Przygienda et al. "RIFT: Routing in Fat Trees" draft-ietf-rift-rift-01, RIFT Working Group, Internet-Draft, IETF Trust, Apr. 26, 2018, 78 pp.

Przygienda et al. "RIFT: Routing in Fat Trees" draft-przygienda-rift-02, Network Working Group, Internet-Draft, IETF Trust, Jun. 26, 2017 48 pp.

Rekhter et al. "A Border Gateway Protocol 4 (BGP-4)" Network Working Group, RFC 4271, The Internet Society, Jan. 2006, 104 pp.

Thubert et al. "Available Routing Constructs" draft-thubert-rtgwg-arc-03, RTGWG, Internet-Draft, IETF Trust, Jan. 22, 2015, 21 pp.

U.S. Appl. No. 15/390,356, filed Dec. 23, 2016, Juniper Networks, Inc. (inventor: Przygienda et al.) entitled "Apparatus, System, and Method for Distributing Routing Protocol Information in Clos Fabrics".

Examination Report from counterpart European Application No. 18191690.9, dated Mar. 12, 2020, 8 pp.

Response filed Jul. 9, 2020 to the Examination Report from counterpart European Application No. 18191690.9, dated Mar. 12, 2020, 13 pp.

* cited by examiner

REDUCED CONFIGURATION FOR MULTI-STAGE NETWORK FABRICS

This application claims the benefit of U.S. Provisional Patent Application 62/573,495, filed Oct. 17, 2017, and U.S. Provisional Patent Application 62/625,452, filed Feb. 2, 2018, the entire content of each of which being incorporated herein by reference.

TECHNICAL FIELD

This disclosure relates to computer networks.

BACKGROUND

In a typical data center, a large collection of interconnected servers provides computing and/or storage capacity for execution of various applications. For example, a data center may comprise a facility that hosts applications and services for subscribers, i.e., customers of data center. The data center may, for example, host all of the infrastructure equipment, such as networking and storage systems, redundant power supplies, and environmental controls. In most data centers, clusters of storage systems and application servers are interconnected via a high-speed switch fabric provided by one or more tiers of physical network switches and routers. More sophisticated data centers provide infrastructure spread throughout the world with subscriber support equipment located in various physical hosting facilities.

Data centers are often made up of a large number of devices, including both servers and devices forming an IP fabric. In some network topologies, routers within the fabric may be layered in a multi-staged configuration that allows for various aspects of path minimization, redundancy, and more efficient routing of network traffic within the fabric.

SUMMARY

In general, this disclosure describes techniques for network configuration utilizing aspects of automatic topology discovery and configuration. In particular, network devices such as routers in a network having folded multi-stage structure (e.g., fat tree networks, folded Clos networks, folded Banyan networks) are configured to automatically determine aspects of their relationship and cross-connections within other routers in the network. Such networks may define levels for each router in the network, where the level for a given router identifies on what tier of a network tree that router resides. During fabric configuration, a particular router may automatically observe other neighbor routers' levels and derive, from those routers' communications indicating their levels, at what level that particular router resides. Various techniques are described regarding automatic router configuration and propagation of derived level information between neighboring routers that enable router level determination to cascade through the network, thereby allowing some routers to automatically discover their own level within the topology.

In one example, a method includes receiving, by a first network device, messages from a plurality of network devices in a network. Each of the messages indicates a level value of a respective sending network device in a network topology. The method also includes determining, by the first network device and based on the respective levels indicated by the messages, a level value of the first network device in the network topology. The method further includes determining, by the first network device and based on the determined level value, a mechanism by which to forward network traffic to one or more of the plurality of network devices. The method also includes forwarding the network traffic according to the determined mechanism.

In another example, a first network device includes a plurality of network interfaces configured to be communicatively coupled to a plurality of network devices forming a network topology, and one or more processors comprising processing circuitry configured to: receive messages from the plurality of network devices, each of the messages indicating a level value of a respective sending network device of the plurality of network devices; determine, based on the respective levels indicated by the messages, a level value of the first network device in the network topology; determine, based on the determined level value, a mechanism by which to forward network traffic to one or more of the plurality of network devices; and forward the network traffic according to the determined mechanism.

In another example, a system includes a plurality of network devices forming a network topology. The plurality of network devices includes a first network device communicatively coupled to the plurality of network devices. The first network device is configured to receive messages from the plurality of network devices. Each of the messages indicates a level value of the sending network device in a network topology. The first network device is also configured to determine, based on the respective levels indicated by the messages, a level value of the first network device in the network topology. The first network device is further configured to determine, based on the determined level value, how to forward network traffic to one or more of the plurality of network devices.

In another example, a computer-readable medium, such as a computer-readable storage medium has stored thereon instructions that cause a processor of a first network device to receive, by the first network device, messages from a plurality of network devices in a network. Each of the messages indicating a level value of a respective sending network device in a network topology. The instructions also cause the processor to determine, by the first network device and based on the respective levels indicated by the messages, a level value of the first network device in the network topology. The instructions further cause the processor to determine, by the first network device and based on the determined level value, how to forward network traffic to one or more of the plurality of network devices.

The details of one or more examples are set forth in the accompanying drawings and the description below. Other features, objects, and advantages will be apparent from the description and drawings, and from the claims.

DETAILED DESCRIPTION

Figure 1:
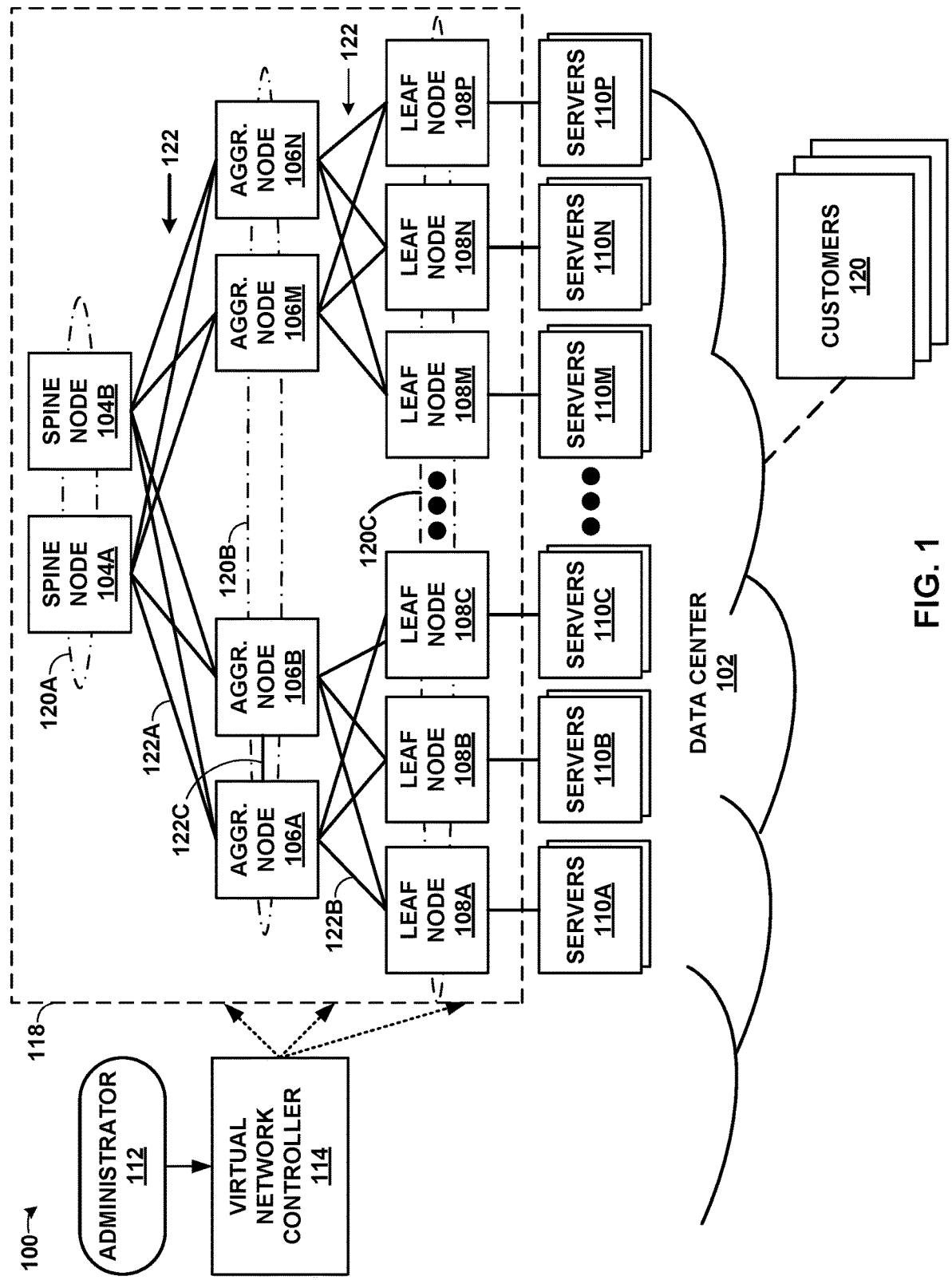
FIG. 1 is a block diagram illustrating an example network including a data center in which examples of the techniques described herein may be implemented.

FIG. 1 is a block diagram illustrating an example network 100 including a data center 102 in which examples of the techniques described herein may be implemented. In general, data center 102 provides an operating environment for applications and services for customer devices 120 coupled to the data center, e.g., by a service provider network (not shown). Data center 102 may, for example, host infrastructure equipment, such as networking and storage systems, redundant power supplies, and environmental controls. In some examples, a service provider network that couples customer devices 120 to data center 102 may be coupled to one or more networks administered by other providers, and may thus form part of a large-scale public network infrastructure, e.g., the Internet.

In some examples, data center 102 represents one of many geographically distributed network data centers. As illustrated in the example of FIG. 1, data center 102 may be a facility that provides network services for customers 120. Customer devices 120 may be devices of entities such as enterprises and governments or individuals. For example, a network data center may host web services for several enterprises and end users. Other example services may include data storage, virtual private networks, traffic engineering, file service, data mining, scientific- or super-computing, and so on. In some examples, data center 102 may be individual network servers, network peers, or otherwise. In some examples, data center 102 is an enterprise or internal data center.

In this example, data center 102 includes a set of storage systems and application servers 110A-110N (servers 110) interconnected via Internet protocol (IP) fabric 118, which may comprise a fabric provided by one or more tiers of physical network devices, such as, for example, routers, gateways, switches, hubs, modems, bridges, repeaters, multiplexers, servers, virtual machines running on one or more of the same, and other example network devices. In the example of FIG. 1, IP fabric 118 includes three tiers of nodes: spine nodes 104A-104N (spine nodes 104), aggregation nodes 106A-106N (aggregation nodes 106), and leaf nodes 108A-108C. Other topologies may be used in other examples. Servers 110 provide execution and storage environments for applications and data associated with customers 120 and may be physical servers, virtual machines or combinations thereof.

In general, IP fabric 118 represents layer two (L2) and layer three (L3) switching and routing components that provide point-to-point connectivity between servers 110. In one example, IP fabric 118 comprises a set of interconnected, high-performance yet off-the-shelf packet-based routers and switches that implement industry standard protocols. In one example, IP fabric 118 may comprise off-the-shelf components that provide Internet Protocol (IP) point-to-point connectivity.

In FIG. 1, virtual network controller 114 provides a high-level controller for configuring and managing routing and switching infrastructure of data center 102. Virtual network controller 114 may represent, for example, a software defined network (SDN) controller that communicates and manages the devices of data center 102 using an SDN protocol, such as the Path Computation Element (PCE) Communication Protocol (PCEP). In some examples, virtual network controller 114 may communicate and manage the devices of data center 102 using eXtensible Messaging and Presence Protocol (XMPP), PCEP or Border Gateway Protocol messages. Additionally or alternatively, virtual network controller 114 may communicate with the routing and switching infrastructure of data center 102 using other interface types, such as a Simple Network Management Protocol (SNMP) interface, path computation element protocol (PCEP) interface, a Device Management Interface (DMI), a CLI, Interface to the Routing System (IRS), or any other node configuration interface.

Virtual network controller 114 provides a logically—and in some cases, physically—centralized controller for facilitating operation of one or more virtual networks within data center 102 in accordance with examples of this disclosure. In some examples, virtual network controller 114 may operate in response to configuration input received from network administrator 112. Additional information regarding virtual network controller 114 operating in conjunction with other devices of data center 102 can be found in International Application Number PCT/US2013/044378, filed Jun. 5, 2013, and entitled PHYSICAL PATH DETERMINATION FOR VIRTUAL NETWORK PACKET FLOWS, which is hereby incorporated by reference.

Although not shown, data center 102 may also include one or more additional switches, routers, hubs, gateways, security devices such as firewalls, intrusion detection, and/or intrusion prevention devices, computer terminals, laptops, printers, databases, wireless mobile devices such as cellular phones or personal digital assistants, wireless access points, bridges, cable modems, application accelerators, or other network devices.

In general, network traffic within IP fabric 118, such as packet flows between servers 110, can traverse the physical network of IP fabric 118 using many different physical paths. For example, a "packet flow" can be defined by values used in a header of a packet, such as the network "five-tuple," i.e., a source IP address, destination IP address, source port and destination port that are used to route packets through the physical network, and a communication protocol. For example, the protocol specifies the communications protocol, such as TCP or UDP, and Source port and Destination port refer to source and destination ports of the connection. A set of one or more packet data units (PDUs) that match a particular flow entry represent a flow. Flows may be broadly classified using any parameter of a PDU, such as source and destination data link (e.g., MAC) and network (e.g., IP) addresses, a Virtual Local Area Network (VLAN) tag, transport layer information, a Multiprotocol Label Switching (MPLS) or Generalized MPLS (GMPLS) label, and an ingress port of a network device receiving the flow. For example, a flow may be all PDUs transmitted in a Transmission Control Protocol (TCP) connection, all PDUs sourced by a particular MAC address or IP address, all PDUs having the same VLAN tag, or all PDUs received at the same switch port.

As shown in the example of FIG. 1, each of spine nodes 104 is communicatively coupled to each of aggregation nodes 106 in IP fabric 118. Aggregation nodes 106A and 106B are coupled to each of leaf nodes 108A-108C, while aggregation nodes 106M and 106N are coupled to each of leaf nodes 108M-108P. Multi-stage data center networks, such as Clos or networks with a so-called "fat tree" topology, may be used in data centers for high performance and resiliency. These fat tree networks may allow for multi-pathing. As one example, a Virtual Chassis Fabric (VCF), in addition to allowing a multi-staged Clos network to be managed as a single device, also allows path weights to reflect and react to path's end-to-end bandwidth. Such a capability is termed "smart trunks" in VCF. The smart trunks capabilities are enabled by the Virtual Chassis Control Protocol (VCCP) that runs inside a VCF to provide globally optimized weights on the multi-paths. An IP fabric, such as IP fabric 118, is a loosely-federated folded multi-stage network where all nodes of the fabric run IP routing protocols. The routing protocols, which may include, for example, external border gateway protocol (EBGP), include all paths between leaf nodes 108 in IP fabric 118, and equal cost multipath (ECMP) is used to utilize all paths. For instance, there are eight paths between any two leaf nodes 108 in IP fabric 118, assuming each path traverses aggregation nodes 106 twice and one of spine nodes 104. The Routing in Fat Trees (RIFT) protocol allows use of any set of all available least-hops paths disregarding ECMP constraints. Additional information regarding RIFT can be found in Internet-Draft entitled RIFT: Routing in Fat Trees (draft-ietf-rift-rift-01), dated Apr. 26, 2018, as promulgated by the Internet Engineering Task Force (IETF), which is incorporated herein by reference.

In some multi-staged networks such as IP fabric 118, each switch resides in a defined layer of the network. As shown in the example of FIG. 1, spine nodes 104 reside in a first, top layer 120A, aggregation nodes 106 reside in a second layer 120B, and leaf nodes 108 reside in a third layer 120C (collectively, "layers 120"). Further, each of the nodes 104, 106, 108 may have various connectivity to other switches in the IP fabric 118. For example, spine nodes 104 and aggregation nodes 106 each have links 122 connecting each of the switches between the first layer 120A and the second layer 120B as depicted. Similarly, the aggregation nodes 106 and the leaf nodes 108 also include links 122 connecting each of the switches between the second layer 120B and the third layer 120C as depicted.

In some of the examples described herein, various links 122 are identified based on their use relative to a particular switch within the IP fabric 118. More specifically, and as used herein, some links 122 are identified as "ascending" links 122A (also referred to as "north-bound" links), some links 122 are identified as "descending" links 122B (also referred to as "south-bound" links), and some links 122 are identified as "lateral" links 122C (also referred to as "east-west" links). From the perspective of a particular switch, such as aggregation node 106A, an ascending link 122A is a link 122 that supports connectivity to a neighbor switch (or just "neighbor") (e.g., spine node 104A) at a higher level 120 in the network topology (e.g., the IP fabric 118), and a descending link 122B is a link 122 that supports connectivity to a neighbor switch (e.g., leaf node 108A) at a lower level in the network topology. Similarly, a lateral link 122C is a link 122 that supports connectivity to a neighbor switch (e.g., aggregation node 106B) at the same level in the network topology.

As used herein, the terms "neighbor switch" and "neighbor" refer to switches to which a particular switch has a direct (e.g., "one-hop") connection. During operation, the particular switch may send "hello" messages that traverse one hop only, which are received by each neighbor switch of that particular switch. Similarly, the neighbor switches may also send one-hop hello messages which are received by the particular switch. As such, neighboring switches may perform handshakes to detect neighbor relations. For example, aggregation node 106A's neighbor switches include spine nodes 104A, 104B, and leaf nodes 108A, 108B, 108C. While the ascending link 122A and descending link 122B are labelled in FIG. 1 relative to aggregation node 106A, the function of each link 122 may be construed differently relative to the different switches to which that link 122 is attached. For example, while the link 122A is referred to above as an ascending link 122A relative to aggregation node 106A, that same link 122A is a descending link 122A from the perspective of spine node 104A. Similarly, the link 122B is a descending link 122B relative to aggregation node 106A, but that same link 122B is an ascending link 122B from the perspective of leaf node 108A.

In accordance with some example aspects of the techniques of this disclosure, some switches within the IP fabric 118 are configured to automatically determine their level 122 within the network topology (e.g., IP fabric 118) based on level information received from neighboring switches. Some switches may be manually pre-configured with a "configured level." For example, a switch may be considered to have a configured level when CONFIGURED_LEVEL is not equal to UNDEFINED_LEVEL, or when a level value is implied by other manually-configured settings (e.g., if a switch is set as a spine node or a leaf node). Such switches are referred to as having a configured level. Switches with an unknown level (e.g., CONFIGURED_LEVEL=UNDEFINED_LEVEL) may derive their own level value (e.g., LEVEL_VALUE) based on a neighbor that has a level value of its own, initially presuming that the particular switch is one level below the neighbor. The particular switch may later determine that the original, derived level information may be incorrect based on subsequently received level information from the same or other neighbors. The particular switch may then update its own level information, and may transmit its own level information to other neighbors for their own use. Such switches are referred to as having a "derived level" (e.g., when they determine their own level based on the automatic level derivation processes described herein). In some examples, LEVEL_VALUE of a switch may be first defined based on CONFIGURED_LEVEL (e.g., if CONFIGURED_LEVEL is defined), and then based on a determined DERIVED_LEVEL (e.g., if CONFIGURED_LEVEL is undefined, LEAF_ONLY is FALSE, SUPERSPINE_FLAG is FALSE). As such, network level information may propagate throughout the fabric 118, allowing at least some of the switches to determine their own level in the fabric 118, and their own relation to neighboring switches. The switches may then forward traffic based on their determined levels and relation to the neighboring switches.

The techniques of this disclosure may provide one or more technical advantages over prior protocols. For example, the techniques of this disclosure may avoid the requirement for network administrators 112 to manually configure various parameters for each switch, such as defining each level 120 for each switch during configuration of the IP fabric 118 or the individual nodes 104, 106, 108 that make up the IP fabric 118 (e.g., spine nodes 104, aggregation nodes 106, leaf nodes 108). This may avoid configuration errors and administrative burden on network administrators. Some example techniques allow administrators to network connect in-band to neighbor devices within the fabric prior to certain aspects of configuration of those devices, thereby avoiding the need to connect those devices to an out-of-band network. Further, deriving level via top-down diffusion, (e.g., from the spine nodes down, as described herein), allows nodes 104, 106, 108 in the IP fabric 118 to address situations when there is the possibility of uneven stages in the fabric, a problem in which a bottom-up methodology may not be able to address.

Figure 2:
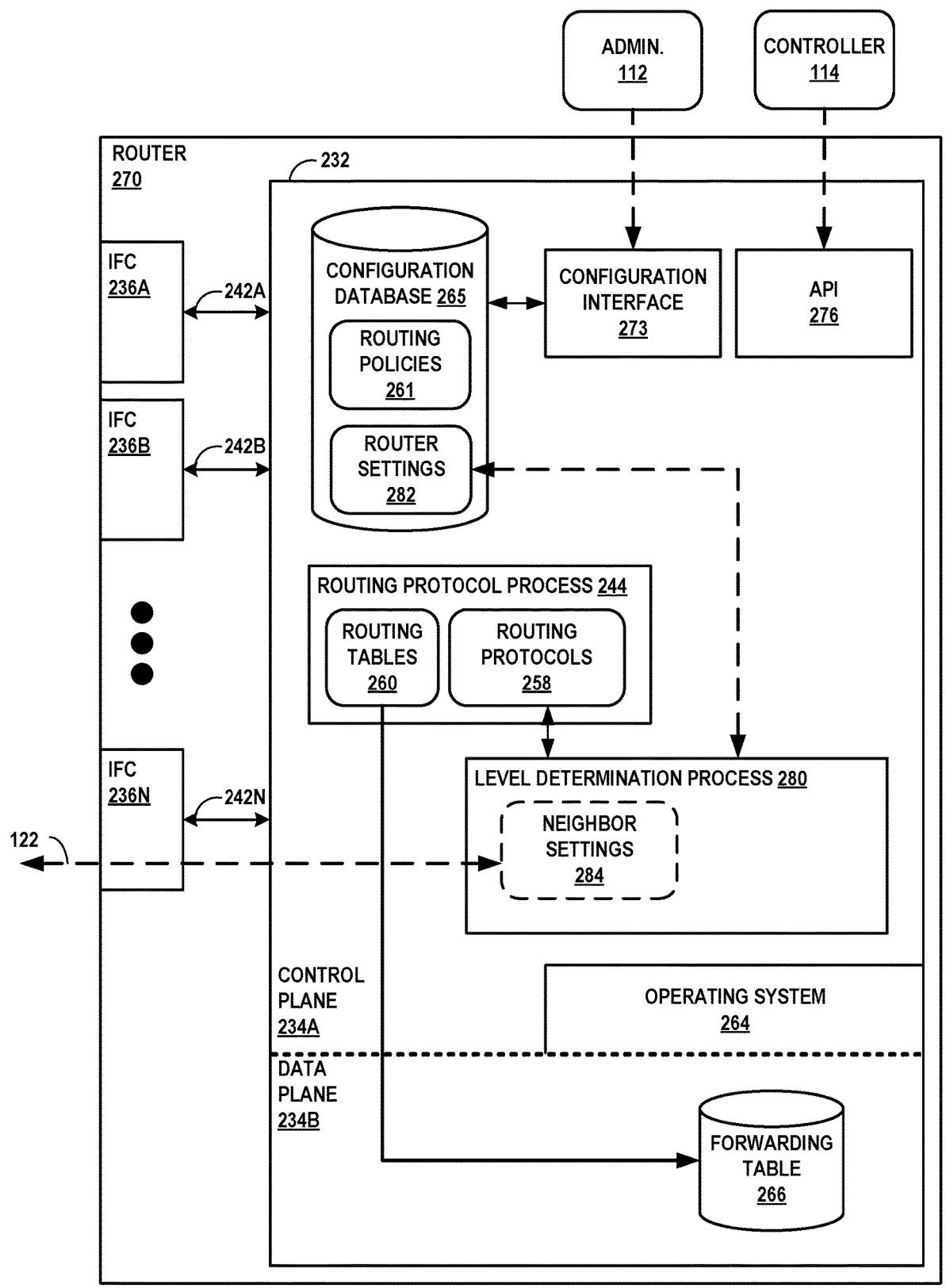
FIG. 2 is a block diagram illustrating an example of a router that implements an automatic level derivation process, in accordance with techniques of the disclosure.

FIG. 2 is a block diagram illustrating an example of a router 270 that implements an automatic level derivation process, in accordance with techniques of the disclosure. In one example, a level determination process 280 may operate as a submodule of routing protocol 258. For purposes of illustration, example router 270 may be described in the context of network 100 and may represent an example instance of nodes 104, 106, 108 of FIG. 1.

Router 270 includes a control unit 232 and interface cards 236A-236N ("IFCs 236") coupled to control unit 232 via internal links 242A-242N. Control unit 232 may comprise one or more processors (not shown in FIG. 2) that execute software instructions, such as those used to define one or more software or computer programs, stored to a computer-readable storage medium (not shown in FIG. 2), such as non-transitory computer-readable mediums including a storage device (e.g., a disk drive, or an optical drive) or a memory (such as Flash memory, random access memory or RAM) or any other type of volatile or non-volatile memory, that stores instructions to cause the one or more processors to perform the techniques described herein. Alternatively, or additionally, control unit 232 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

In this example, control unit 232 is divided into two logical or physical "planes" to include a first control or routing plane 234A ("control plane 234A") and a second data or forwarding plane 234B ("data plane 234B"). That is, control unit 232 implements two separate functionalities, e.g., the routing/control and forwarding/data functionalities, either logically, e.g., as separate software instances executing on the same set of hardware components, or physically, e.g., as separate physical dedicated hardware components that either statically implement the functionality in hardware or dynamically execute software or a computer program to implement the functionality.

Control plane 234A represents hardware or a combination of hardware and software of control unit 232 that define control plane functionality of router 270. Control plane 234A manages and controls the behavior of router 270, including the behavior of data plane 234B. Operating system 264 of control plane 234A provides a run-time environment for multiple different processes. Operating system 264 may represent, for example, a UNIX operating system derivative such as Linux or Berkeley Software Distribution (BSD). Operating system 264 offers libraries and drivers by which processes may interact with data plane 234B, for example, or other hardware of router 270, including a file-system, storage device(s), and main memory for router 270. Libraries and drivers of operating system 264 may include Application Programming Interfaces (APIs) that provide standard interfaces for developers to invoke the functionality of operating system 264 and router 270 exposed by the libraries and drivers.

Control plane 234A executes one or more processes. Routing protocol process 244 ("RP module 244") represents a routing protocol process that executes one or more routing protocols 258 by which at least some of the routing information stored to one or more routing tables 260 may be determined. For example, routing protocols 258 may include the RIFT protocol. Routing tables 260 represent a data structure for storing routing information and may represent tables, lists, trees/tries, or other data structures. A routing table may alternatively be referred to as a routing information base or may alternatively be considered a data structure within the routing information base of the router 270.

Routing tables 260 stored to a computer-readable storage device of control unit 232 (not shown in FIG. 2) may include information defining at least a portion of a network topology of a network, such as IP fabric 118 of FIG. 1. Each of routing tables 260 may be associated with a different address family or network layer protocol, such as unicast or multicast IPv4 and IPv6, and MPLS. Any one or more of routing tables 260 may be predefined by the routing protocol process 244 or may be explicitly created by an administrator 112 using configuration interface 273 or by controller 114 using application programming interface (API) 276. Router 270 receives configuration data via the configuration interface 273 or API 276 and stores the configuration data to configuration database 265.

Configuration interface 273 is a process executing on control plane 234B that provides an interface by which administrator 112, a network operator or network management system for instance, may modify the configuration database 265 of router 270. Configuration interface 273 may present a Command Line Interface (CLI) and/or a graphical user interface (GUI) by which an administrator or other management entity may modify the configuration of router 270 using text-based commands and/or graphical interactions, respectively. In addition, or in the alterative, configuration interface 273 may present an agent that receives Simple Network Management Protocol (SNMP), Border Gateway Protocol messages, or Netconf commands from a management device to set and retrieve configuration information in configuration database 265 for router 270.

Application programming interface (API) 276, in the illustrated example, is a communications interface by which a controller 114 may modify the configuration database 265 or modify any of routing tables 260. Controller 114 may represent a network management system, a software-defined networking (SDN) controller, and/or orchestration system. API 276 may be a HTTP-based RESTful interface using JavaScript Object Notation (JSON) or eXtensible Markup Language data objects for exchanging configuration data and routing information between the controller 114 and the router 270. API 276 may be another type of API, such as a Remote Procedure Call (RPC) based API.

Routing protocol process 244 resolves the topology defined by routing information in routing tables 260 to select and/or determine one or more active routes through the network. Routing protocol process 244 may then synchronize data plane 234B with these active routes, where data plane 234B maintains a representation of these routes as forwarding table 266 (alternatively, "forwarding information base (FIB) 266"). Routing protocol process 244 may generate forwarding table 266 in the form of a radix or other lookup tree to map packet information (e.g., header information having destination information and/or a label stack) to next hops and ultimately to interface ports of IFCs 236. The operating system 264 kernel may maintain a master copy of the forwarding table 266 and install portions of the master copy to forwarding components of data plane 234B, such as packet forwarding engines.

Forwarding or data plane 234B represents hardware or a combination of hardware and software of control unit 232 that forwards network traffic in accordance with forwarding table 266. Data plane 234B may include one or more forwarding units that each includes, for example, one or more packet forwarding engines ("PFEs") each coupled to one or more interface cards. A forwarding unit may each represent, for example, a dense port concentrator (DPC), modular port concentrator (MPC), flexible physical interface card (PIC) concentrator (FPC), or another line card, for instance, that is insertable within a router 270 chassis or combination of chassis.

In accordance with techniques of this disclosure, the various routers 270 in the IP fabric 118 execute the level determination process 280 at various times, such as during device startup, when joining fabric 118, during fabric reconfiguration (e.g., when receiving level change from neighbors), periodically, or continuously. Router 270 maintains its own router settings 282, such as level settings (e.g., self.level, self.derivedLevel) and spine or leaf settings (e.g., self.attribute.isSpine, self.attribute.Leaf2LeafProcedures, self.capabilities.leaf_to_leaf_procedures). During operation, router 270 receives various settings information from neighbor routers, such as level information (e.g., neighbor.level) or settings information (e.g., neighbor.capabilities.leaf_to_leaf_procedures). Router 270 may communicate with neighbors through, for example, IFCs 236 across link 122. Level determination process 280 uses router settings 282 and neighbor settings 284 to determine router 270's own level. Once router 270 has a configured level, the router may then form adjacencies with its neighbor routers, thereby allowing router 270 to participate in various routing functionalities such as, for example, transmitting distance vectors for routes to lower neighbors or passing link state information to higher neighbors. Level determination process 280 is described in greater detail below with respect to FIGS. 3-6.

Distance vectors, or distance vector routing information, may include information about the routing table of router 270. Link state information may include connectivity-related information obtained by one or more link-state algorithms (e.g., a shortest path first algorithm), i.e., information about the neighbor routers of router 270. Routing protocol process 244 may operate according to properties of a modified link-state routing protocol (e.g., J. Moy, OSPF Version 2, RFC 2328, April 1998; and D. Oran, OSI IS-IS Intra-domain Routing Protocol, RFC 1142, February 1990) when sending routing information to an ascending neighbor and may operate according to properties of a path-vector protocol (e.g., Y. Rekhter, A Border Gateway Protocol 4 (BGP-4), RFC 4271, January 2006) when sending routing information to a descending neighbor. The entire contents of RFC 2328, RFC 1142, and RFC 4271 are incorporated by reference herein.

Figure 3:
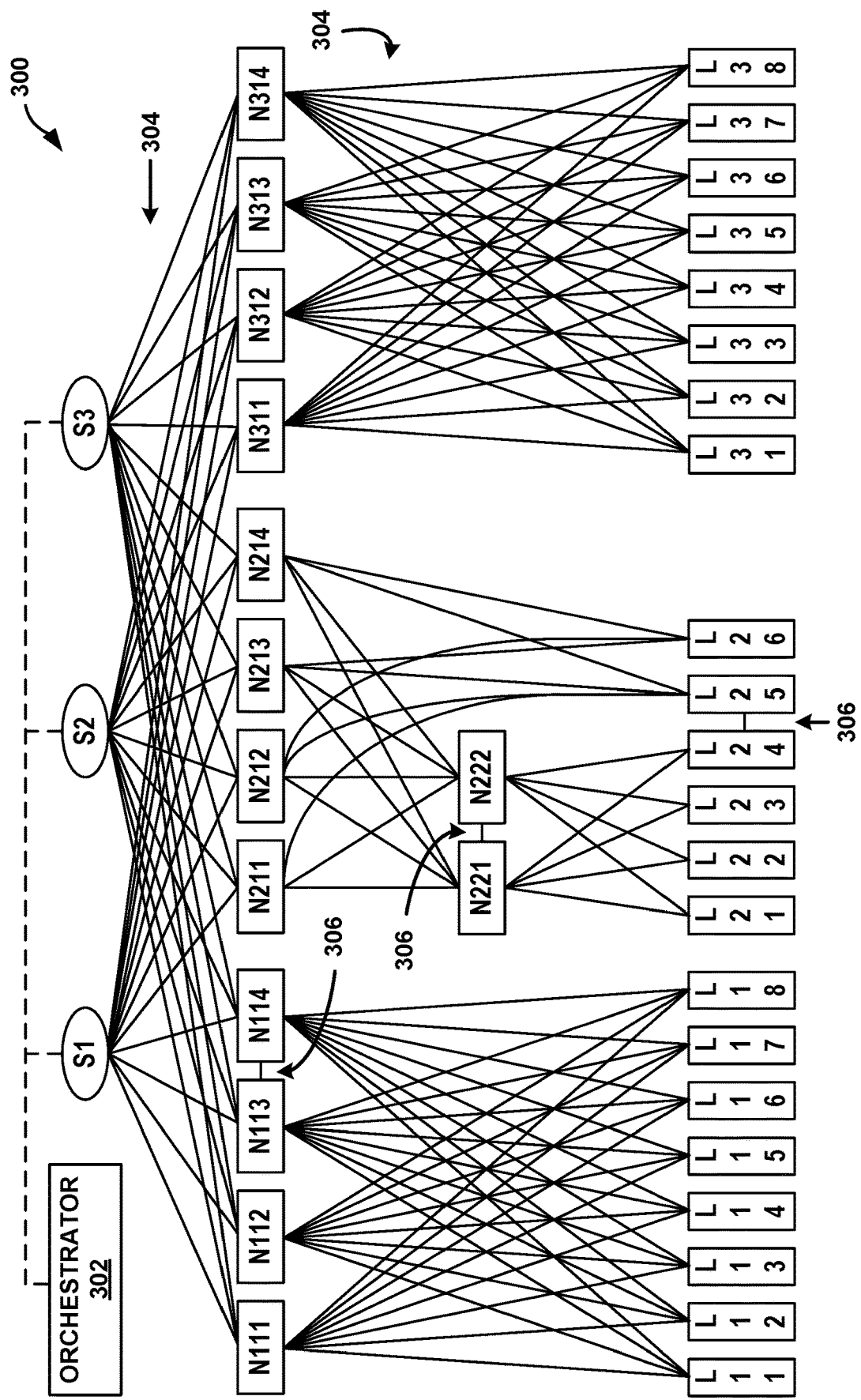
FIG. 3 is a block diagram illustrating a network topology graph of an example data center network such as the network shown in FIG. 1.
Figure 4A:
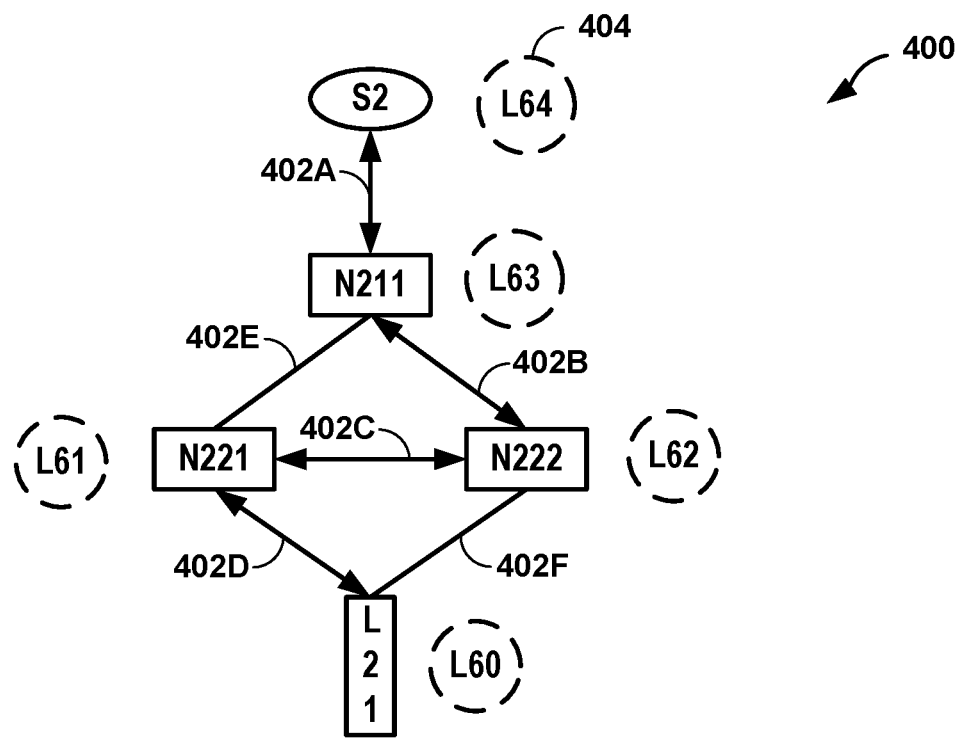
FIGS. 4A and 4B are block diagrams illustrating example scenarios in which a subset of nodes from the topology diagram shown in FIG. 3 execute aspects of a level determination process in a particular sequence during fabric configuration.
Figure 4B:
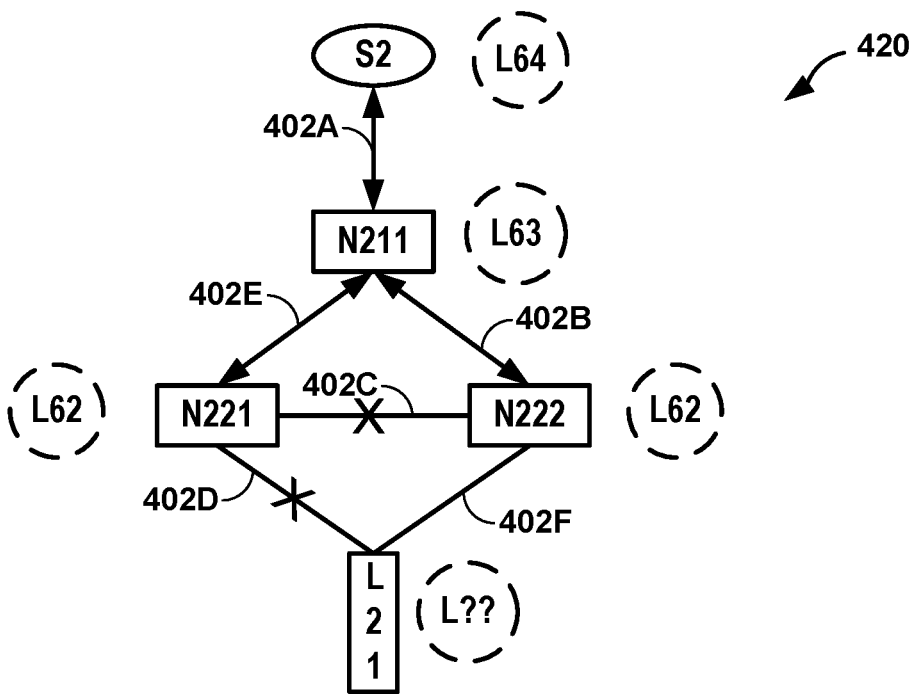
Figure 5:
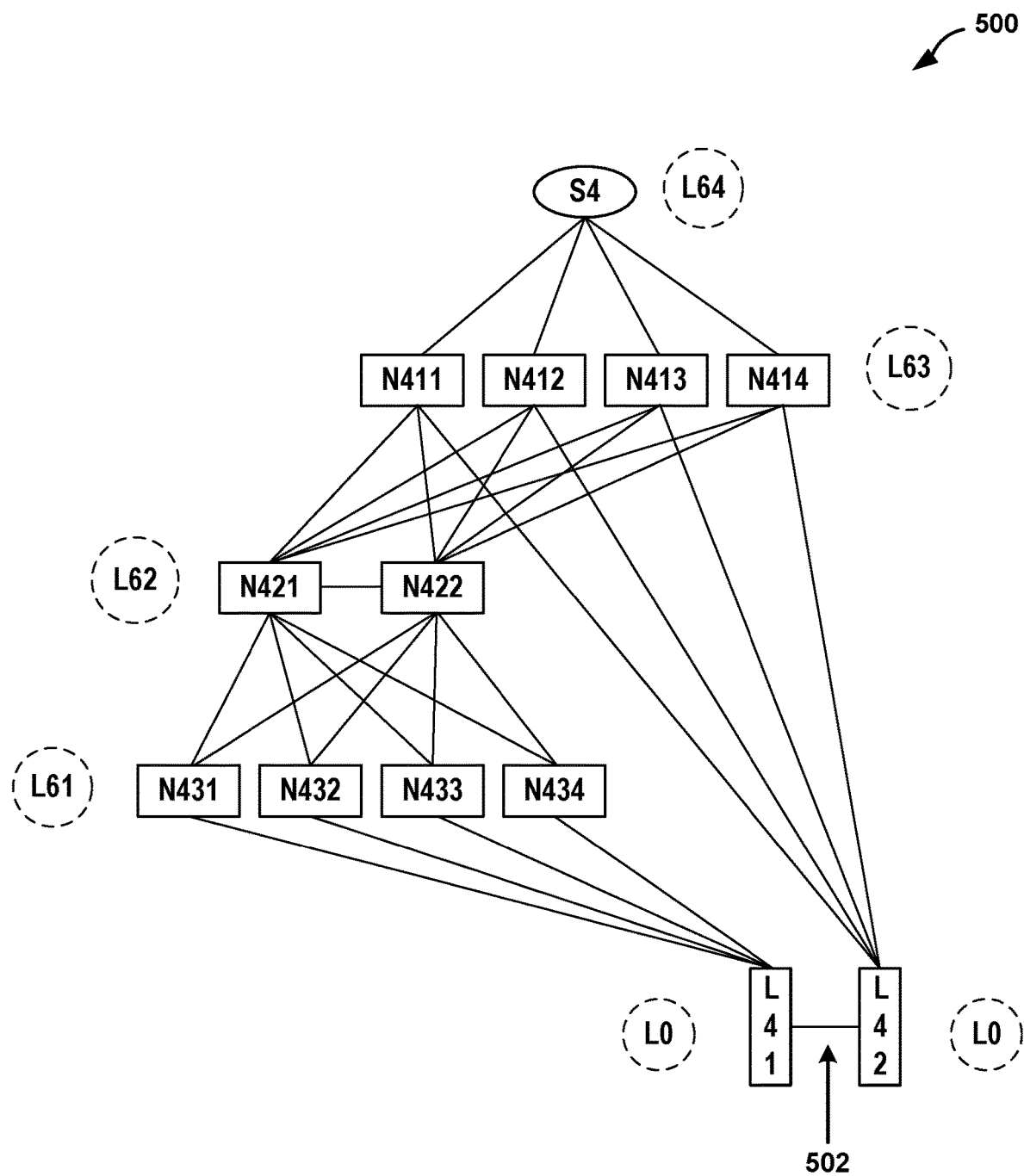
FIG. 5 is a block diagram illustrating a network topology graph of an example datacenter network such as network shown in FIG. 1.

FIGS. 3-5 illustrate several aspects of the level determination process 280 in an example network. FIG. 3 is a block diagram illustrating a network topology graph ("graph") 300 of an example datacenter network such as network 100 shown in FIG. 1. Graph 300 is an abstraction of the example network, provided for purposes of illustrating various operations of the level determination process 280. Graph 300 includes spine nodes S1-S3 (collectively, "spine nodes S"), aggregation nodes N111-114, N211-214, N221-N222, N311-314 (collectively, "aggregation nodes N"), and leaf nodes L11-L18, L21-28, L31-38 (collectively, "leaf nodes L"), each of which represent nodes in the graph 300. Graph 300 also includes various edges 304, 306 connecting together nodes in the graph 300. Edges 304 represent ascending/descending connections between two nodes, where edges 306 represent lateral connections between two nodes.

Each node in the graph 300 represents a computing device, such as routers 270, and each edge 304, 306 represents a communications path between two devices. For example, spine nodes S may be similar to spine nodes 104, aggregation nodes N may be similar to aggregation nodes 106, and leaf nodes L may be similar to leaf nodes 108. Further, edges 304 may be similar to links 122 and edges 306 may be similar to link 122C. In this example, each node S, N, L may represent a router such as router 270, or a switch with routing capabilities. As such, for purposes of convenience and ease of illustration, the nodes S, N, L may be addressed herein as if they are the computing devices they represent. For example, this disclosure may refer to a particular node as performing certain computing operations, which indicates not that the conceptual node in the graph is performing those operations, but that the computing device of which that node represents is performing those operations. Similarly, the topology diagram 300 or other components thereof may also be referred to as their real-world counterparts.

In this example, there is a partial extra stage that includes aggregation nodes N221 and N222. This extra stage services twice as many leaf routers (e.g., L21-L24) as in the section without the extra stage (e.g., L25-L26). Thus, the leaf routers going through the partial extra stage are expected to generate approximately half the throughput of leaf routers that don't go through the partial extra stage.

FIG. 3 further includes an orchestrator 302. Orchestrator 302 may be similar to the virtual network controller 114 shown in FIGS. 1 & 2. While orchestrator 302 may have network connectivity to any or all of the nodes S, N, L within the diagram 300, orchestrator 302 is not necessarily a node S, N, L within the fabric 118, and that FIG. 3 illustrates connectivity only between the orchestrator and the spine nodes S (in broken line) for purposes of describing certain operations. In one example, orchestrator 302 may serve as the source of truth for IP fabric 118, through connection to spine nodes S. For example, orchestrator 302 may establish RIFT adjacencies to the spine nodes S using a default spine level value, such as 64. Orchestrator 302 may also indicate that it is overloaded, thereby avoiding receipt of transit traffic. These adjacencies may also provide a view of the fabric topology from each spine node S. The derived level for a node S, N, L may be maintained as long as that router has any RIFT adjacencies. Thus, once the fabric 118 is up, if the spine nodes S are adequately connected, orchestrator 302 does not need to maintain a RIFT adjacency. Orchestrator 302 establishes a RIFT adjacency to any spine node S that has rebooted or been completely disconnected, in order to add that spine node S back into the fabric 118 as a spine node S.

In the various examples described herein, any or all of the nodes S, N, L may execute portions of level determination process 280. Some nodes S, N, L may determine an initial level for themselves. For example, during operation (e.g., initial switch start-up, fabric 118 formation, initial connectivity to fabric 118, joining fabric 118), level determination process 280 of one or more nodes may determine that a switch includes a pre-defined level. For example, spine node S1 may be configured as a spine switch (e.g., self.attribute.isSpine=TRUE), or may be manually configured with the first level 120A (e.g., self level=2, self level=64, self level=SPINE LEVEL), and thus may have a pre-defined level. That particular node may determine their pre-defined level as such:

```
SPINE_LEVEL = 64
self.level = UNDEFINED_LEVEL
if self.attribute.isSpine is TRUE
        then self.level = SPINE_LEVEL
if (self.attribute.Leaf2LeafProcedures is TRUE) OR
    (self.attribute.LeafImplementationOnly is TRUE)
        then self.level = 0
if configuredLevel is not UNDEFINED_LEVEL
        then self.level = configuredLevel
else
        then self.level = derive_level( ),
``` where configuredLevel is a pre-determined level, which may have been configured by administrator 112 manually as a part of router settings 282, and where "derive level( )" represents the dynamic level derivation steps associated with level determination process 280, as described herein. Under RIFT, the dynamic level derivation steps may be referred to collectively as "zero touch provisioning" ("ZTP"). In some embodiments, if Leaf2LeafProcedures is TRUE, this implies a known level of 0. If Leaf2LeafProcedures is set to FALSE, this does not imply anything about level. If level is set to 0, then the level is KNOWN and the node is a leaf, but this does not necessarily imply anything about Leaf2LeafProcedures.

For example, presume spine node S1 is configured with self.attribute.isSpine equal to TRUE, and is not configured with a configuredLevel (e.g., UNDEFINED_LEVEL). As such, when executing the initial level determination process 280, spine node S1 sets self level to SPINE_LEVEL (e.g., 64). Similarly, presume leaf node L11 is configured with self attribute.Leaf2LeafProcedures set to TRUE or self.attribute.LeafImplementationOnly set to TRUE, and with no configuredLevel. As such, when executing the initial level determination process, level determination process 280 of leaf node L11 sets self.level to 0. Some nodes S, N, L may include configuredLevel. For example, presume administrator 114 manually configured spine node S2 to self level equal to 64, or leaf node L25 equal to 0. As such, the configuredLevel of those nodes S2, L25 may have a pre-determined level set manually.

Those nodes S, N, L without a pre-determined level may each execute a level derivation process as a part of level determination process 280. Presume, for example, that aggregation nodes N each have no pre-defined level (e.g., self.level=UNDEFINED_LEVEL, configuredLevel=UNDEFINED_LEVEL, self attribute.isSpine=FALSE, self.attribute.Leaf2LeafProcedures=FALSE). As such, nodes N may periodically receive advertised level information from their one-hop neighbors S, N, L, thereby receiving neighbor level information (e.g., neighbor.level). Through exchanging this data amongst themselves, nodes N may converge on determining their own level (self level).

More specifically, during the level derivation process, a particular node receives level data from neighboring nodes S, N, L indicating the level of that neighbor. Some neighbors may have a pre-defined level, as discussed above, such as spine node S1. Further, since other nodes N may also be performing this same level determination process 280, some neighbors may also be in various stages of determining their own level. At various times through the process, some neighbors may have their level in an unknown state (e.g., self.level=UNDEFINED_LEVEL, self.derivedLevel=UNDEFINED_LEVEL, self.configuredLevel=UNDEFINED_LEVEL), or they may have determined their own level via this process. Nodes share their own level information with each other during this process in order to facilitate level determination of other nodes.

When a particular node (e.g., node N111) receives level information from a neighbor, the particular node may update its own level information based on the neighbor's level as a part of level determination process 280. However, in this example, N111 may not have stored topology data for the topology of the network 100 or information indicating whether each particular neighbor is a higher-level neighbor, a lower-level neighbor, or a lateral neighbor. As such, level determination process 280 of node N111 evaluates known, non-leaf level information of neighbors, initially, as if the neighbor is a higher-level neighbor. For example, level determination process 280 of node N111 may execute the following logic when receiving level information from a neighbor as such:

```
if ((neighbor.attribute.Leaf2LeafProcedures is FALSE) AND
    (neighbor.level > 0))
        if ((self.level is UNDEFINED_LEVEL) AND (neighbor.level is not
           UNDEFINED_LEVEL)) OR
        (self.level is KNOWN AND neighbor.level is KNOWN
           AND neighbor.level > self.level + 1)
               self.level = neighbor.level − 1
               self.derivedLevel = self.level
               send self level information to neighbor
```

Level determination process 280 of node N111 derives the highest level achievable (Highest Available Level (HAL)) from its own neighbors by assuming a southbound role compared to its new neighbor. In other words, the HAL represents the highest defined level value from all Valid Offered Levels (VOLs) yet received. Since a leaf node does not, by definition, have any southbound neighbors, the subject node does not derive level information from any leaf nodes L. When the subject node receives level data from a neighbor that has a known level greater than zero, the subject node presumes the neighbor is a northern neighbor (e.g., at a level one greater than itself) and sets self.level to one less than that neighbor's value (e.g., HAL minus one).

Further, level determination process 280 may be configured to store an indication of whether it has a derived level rather than a pre-determined level (e.g., self.derivedLevel=HAL−1). In some situations, the neighbor node may have been a lateral neighbor, or a descending neighbor. As such, the subject node may have assumed a self.level that is less than its true level. Accordingly, if the subject node receives level information from another neighbor indicating that neighbor's level is less than the subject node's derived level plus 1, then the subject node changes its own level to one less than the higher neighbor's level.

FIGS. 4A and 4B are block diagrams 400, 420 illustrating example scenarios in which a subset of nodes S2, N211, N221, N222, and L21 from topology diagram 300 execute aspects of level determination process 280 in a particular sequence during fabric configuration. Each of FIGS. 4A and 4B show nodes S2, N211, N221, N222, and L21 along with specific edges 402A-402F (collectively, "edges 402") representing communications paths between the nodes. The edges 402 may be similar to edges 304, 306 shown in FIG. 3. In addition, each node S2, N211, N221, N222, and L21 is illustrated with a level indicator 404 adjacent to the particular node, illustrated in broken line. The numerical value in level indicator 404 is used, merely for illustration, to represent at what level the associated node has currently determined it is at (e.g., the node's self.level).

Referring now to FIG. 4A, presume that each of nodes S2, N211, N221, N222, and L21 are initially configured with:

> self.level = UNDEFINED_LEVEL
> self.derivedLevel = UNDEFINED_LEVEL
> self.configuredLevel = UNDEFINED_LEVEL, At such time, level determination process 280 of any of nodes S2, N211, N221, N222, and L21 would encounter only nodes of unknown level, and therefore would not attempt to reconfigure its own level.

Next, presume that spine node S2 is configured as a spine node (e.g., self attribute.isSpine=TRUE). At time $t_1$, level determination process 280 of spine node S2 executes the initial level determination process as described above, thereby determining that S2 is a spine node, and that the self level of spine node S2 being set to 64 (as illustrated in FIG. 4A). This happens to be the "true" (i.e., proper) level for spine node S2.

Later, at time $t_2$, node N211 receives level information from its neighbor nodes S2, N221, N222. In one example, node N211 may query its neighbor nodes S2, N221, and N222 for level information. While nodes N221 and N222 are still UNDEFINED_LEVEL at time $t_2$, node S2 has a known, non-zero level. Node S2 transmits or replies with its own level information. In one example under the RIFT protocol, level information is transmitted via a Link Information Element (LIE) (e.g., with a time to live (TTL) of 1 to prevent reaching beyond a single link in the topology). The level information may be automatically generated (e.g., by routing protocol 258) and transmitted to neighbor nodes, in which case querying of neighbor nodes is not performed, or in some examples may be prompted by a request (query) for level information. Node N211 changes its self.level when it performs the level derivation process based on node S2's level information. The information exchange between node N211 and node S2 at time $t_2$ is represented by arrowed edge 402A. A Valid Offered Level (VOL) occurs when a switch receives a valid LIE of a neighbor persisting for the duration of the holdtime interval on the LIE. A neighbor's LIE may be considered valid when, for example, the neighbor's LIE passes checks for adjacency formation while disregarding clauses involving level value. In other embodiments, a neighbor's LIE may be considered valid when passing basic packet checking rules (e.g., without waiting for adjacency formation). The LIE associated with the VOL identifies the level information of the neighbor. In some examples, valid LIEs from neighbor nodes offering a level value of zero are not considered VOLs. In some examples, valid LIEs from neighbor nodes that include a flag setting "NOT_A_ZTP_OFFER=TRUE" are not considered VOLs.

For example, with spine node S2 as the "neighbor" node (for purposes of this stage of execution by node N211), node N211 determines that spine node S2 is not a leaf node, that neighbor.level is greater than zero, that self level is UNDEFINED_LEVEL, and that neighbor.level is not UNDEFINED_LEVEL. Accordingly, node N211 sets self level to 63, one less than spine node S2's level, as shown in FIG. 4A. This also happens to be the true level for node N211.

At time $t_3$, in some examples aggregation node N222 queries its neighbor nodes N211, N221, and L21 for level information. Nodes N211, N221, and L21 reply with their own level information, e.g., by sending a LIE. In some examples, aggregation node N222 receives this information automatically without requiring explicit querying. The information exchange between node N222 and node N211 at time $t_3$ is represented by arrowed edge 402B. Their replies indicate that nodes N221 and L21 are still UNDEFINED_LEVEL at time $t_3$, but node N211 indicates it has a known, non-zero level. In response to receiving the responses from N211, N221, and L21, level determination process 280 of node N222 changes its self level to 62, one less than that of neighbor node N211. This is the true level for node N222.

Up to this point, level information has propagated down from the top, and each node has thus far determined a proper level. At time $t_4$, if node N221 were to attempt to derive level information from neighbor N211, then node N221 would also end up with a proper level of 62. However, in this example, node N221 happens to receive level information from neighbor node N222 first, as represented by edge 402C. As such, upon executing the level derivation process, node N221 presumes N222 is a northern neighbor, and thus sets its own level at 61, one less than neighbor.level of 62 from N222. This is an incorrect level for node N221.

This inconsistency, in this example, further propagates down to leaf node L21 at time $t_5$. Presume, for example, that node L21 is not configured as a leaf node, or that node L21 executes the level derivation process without having executed the initial level determination process. Further, in this example, node L21 happens to receive level information from the "wrong" neighbor N221 (e.g., a neighbor with incorrect information), as represented by edge 402D. As such, node L21 sets its own level at 60, one less than the neighbor.level of 61 from node N221. This is also an incorrect level for leaf node L21.

FIG. 4B illustrates how level determination process 280 allows nodes to recover from such situations as shown in FIG. 4A. As mentioned above, level determination process 280 of nodes S, N, L track whether their own level is a pre-determined level or a derived level. If a particular node receives level information from a neighbor that is announcing its level as more than one higher than the derived level of that node, then level determination process 280 of that node changes its self level to one less than the neighbor's level (as embodied in the above pseudo-code for aspects of the level derivation process 280).

For example, at time $t_6$, aggregation node N221 (currently having a self.derivedLevel of 61) may receive level information from N211, as indicated by edge 402E. Node N211 provides a neighbor.level of 63. As such, since self level is KNOWN, neighbor.level is KNOWN, and neighbor.level is greater than self level plus one, then level determination process 280 of node N221 updates its self.level to be 62, one less than N211's level. This is the correct level for node N221, and serves to rectify at least a portion of the original error when node N221 presumed that it was a southern neighbor of node N222.

At this stage, however, several inconsistencies may still be outstanding in the network 100 based on the above sequence of events. One outstanding problem is that leaf node L21 still has an incorrect level. Another outstanding problem is that node N222 may still construe node N221 as a southern neighbor.

The above inconsistencies may be rectified by level determination process 280 adding an additional process when a node changes its derived level, such as in the above example of N221 changing from 61 to 62. During configuration, neighboring nodes may form adjacencies with each other by exchanging handshake messages. An adjacency identifies certain aspects of the relationship between the two connected nodes, such as respective identifiers, which properties it supports and what level each node is at, what relative direction the adjacent node is from the particular node, and thus how each respective node treats the link. Example types of adjacency relationships (or just "adjacencies") include ascending adjacencies (e.g., where the neighbor is at a higher level than the particular node), descending adjacencies (e.g., where the neighbor is at a lower level than the particular node), lateral adjacencies (e.g., where the neighbor is at the same level as the particular node), and unknown adjacencies (e.g., where one or more of the neighbor or the particular node are currently at an unknown level).

Moreover, an "adjacency relationship" is not formed until handshake messages reflect to each node certain information obtained from the handshake of the other node. Conceptually, each edge 304, 306 may be thought of as a potential adjacency that will eventually get formed. Edges 304, 306 initially begin as "unknown" adjacencies, meaning that the neighbor nodes sharing edge 304, 306 may not have yet discovered each other, or that one neighbor node in the adjacency may not yet have information about the other node, or its own level, or about the adjacency itself. Routers may perform different operations with neighbors based on adjacency information. For example, a given router may transmit distance vectors to its southbound neighbors, where that router may transmit link state information to its northbound neighbors. In a protocol such as RIFT, proper determination of the direction of neighbors in the topology allows different neighbors to be utilized according to their relative relationships, as provided by level determination process 280. As such, it is important for neighbors to understand nodes to which they connect, and where neighbors are in the topology relative to each other.

For example, at time $t_1$, spine node S2 does not have an adjacency formed with node N211. At time $t_2$, however, node N211 causes an adjacency to be formed between nodes N211 and S2. The formed adjacency may also be represented by arrowed edge 402A. Similarly, adjacencies may be formed between nodes N211 and N222 (arrowed edge 402B), between nodes N222 and N221 (arrowed edge 402C), and between nodes N221 and L21 during the above times $t_3$-$t_5$, respectively, and then between nodes N221 and N211 at time $t_6$. Like the improper level of nodes N221 and L21 as initially determined above, the adjacencies between N222 and N221 and between N221 and L21 are suspect.

To rectify such potential adjacency problems, level determination process 280 may also include breaking one or more existing adjacencies at particular times. Whenever a node changes the level that it is advertising as its own level, then the node also resets any pre-existing adjacencies. For example, at time $t_6$, upon changing self.level of node N221, level determination process 280 may include breaking any existing adjacencies between node N221 and any other nodes at the same level or lower. In the example shown in FIGS. 4A and 4B, node N221 had an existing adjacency with node N222 (as represented by arrowed edge 402C in FIG. 4A) and with node L21 (as represented by arrowed edge 402D in FIG. 4A). Accordingly, after updating self.level to 62, node N221 breaks its adjacencies with node N222 because it is at the same level and L21 because it is at a lower level. In some examples, breaking the adjacencies involves node N221 deleting certain neighbor information locally, as well as transmitting an adjacency break command to that neighbor, thereby causing that broken neighbor to also delete local information about the source node N221, and also causing the broken neighbor to set their own self.derivedLevel to UNDEFINED_LEVEL. In other examples, the neighbor may have more information for ZTP that allows it to keep "defined" level even after it lost this adjacency.

Once adjacencies are broken, they may be reformed using level determination process 280, allowing, for example, leaf node L21 to later discover its proper level of 61 from either of nodes N221 or N222. In some examples, when a node loses all adjacencies with neighbors having a level of HAL (e.g., one greater than the current node's determined value), then the current node reverts to an undefined level (e.g., self.level=UNDEFINED_VALUE, derived.level=UNDEFINED_VALUE), and may then re-execute the level derivation process 280, perhaps with a pre-configured delay. Further, in some situations, a node may end up determining a lower level on level change. This lowering of level is facilitated by dropping first from the higher value to undefined (e.g., due to loss of all VOLs for HAL) and then choosing a lower HAL from all available VOLs that subsequently appear due to the node's own change.

Certain aspects of level determination process 280 allow less manual configuration within the network 100. As mentioned above, spine nodes S may be configured with an attribute of isSpine rather than a specific level (e.g., providing a value that serves to seed IP fabric 118). This helps avoid potential misconfiguration of some spine nodes. The top-down diffusion of level data via level determination process 280 allows some nodes in the network to discover their own level data and that of their neighbors.

In some situations, loss of all spine nodes S may cause other nodes to repeatedly try to derive a level from each other, dropping their own level by one and resetting each other. To avoid such a situation, a node sets a flag "NOT_A_ZTP_OFFER" on each LIE delivered to nodes offering their level as the value HAL. An LIE with NOT_A_ZTP_OFFER set to TRUE does not constitute a VOL, and thus is not acted upon by the receiving neighbor.

Further, when a node's HAL changes, that node deletes all pre-existing VOLs and stops accepting VOLs for a pre-determined duration (a "holddown duration") to prevent excessive oscillations. Though potentially slowing level convergence, this holddown duration benefits the stability of IP fabric 118, favoring initial convergence of a node into the network. In some examples, a node that has lost its HAL but has no southbound adjacencies may skip the holddown period. This may speed level dropping convergence.

In some networks 100, routers in IP fabric 118 may not be permanently connected to a different out-of-band network (not shown). During troubleshooting, a router might be temporarily equipped with an out-of-band interface to connect to an out-of-band network, but such configuration may require physical intervention. To avoid such needs, it may be useful to provide a router's loopback address as a route to its neighbors before a formal adjacency is established. For example, presume that, before time $t_1$, administrator 112 connects via an out-of-band network to node N211. At such time, node N211 has no established adjacencies. Further, no formal adjacencies can yet be established between N211 any of its neighbors S2, N221, N222 because none as yet have a known level.

As such, nodes S, N, L may be allowed to form a limited adjacency (or "unknown adjacency") with its neighbors. A subject node such as N211 that does not yet have a level, derived or configured, may send its own information and local prefixes to its neighbors, who may also do the same. These limited adjacencies may be treated as a simplified version of a lateral edge 306 (e.g., an east-west link). By distributing the local prefixes (e.g., router loopback), this allows the nodes to communicate and establish other sessions or facilitate troubleshooting. For example, this may allow administrator 112 to log into node N211 via the out-of-band network, then connect from N211 to any of its neighbors, such as N221, over the limited adjacency edge 402C.

Level determination process 280 may govern the creation of adjacencies based on the following table:

TABLE 1

Table of Adjacency Formation

| Self.Level/Leaf Procedure | Neighbor.Level/ Neighbor.Leaf Procedure | Adjacency Formation |
|---|---|---|
| UNKNOWN/FALSE | UNKNOWN/FALSE | Unknown Adjacency |
| 0/TRUE | 0/TRUE | Lateral Adjacency |
| 0/FALSE | 0/<ANY> | No Adjacency |
| >0/FALSE | 0/<ANY> | Descending/Ascending Adjacency |
| >0/FALSE | Self.Level/FALSE | Lateral Adjacency |
| >0/FALSE | Self.Level + 1/FALSE | Ascending/Descending Adjacency |
| >0/FALSE | Self.Level − 1/FALSE | Descending/Ascending Adjacency |
| 0/FALSE | UNKNOWN/FALSE | Unknown Adjacency |
| UNKNOWN/FALSE | >0/FALSE | *Self derives level then determines adjacency |

Table 1 illustrates the types of adjacencies that are formed by level determination process 280 based on several settings of a particular router and one of its neighbors. More specifically, the first column identifies the level value for the particular router (e.g., self level) and whether leaf procedures are enabled on that router (e.g., self.attribute.Leaf2LeafProcedures). The second column identifies the level value of the neighbor (e.g., neighbor.level) and whether leaf procedures are enabled on that neighbor (e.g., neighbor.attribute.Leaf2LeafProcedures). The third column identifies the type of adjacency that is formed by the level determination process 280 based on the values identified in the first two columns.

Further, as mentioned above, some adjacencies may be formed based on the relative direction of the routers from each other. More specifically, ascending and descending adjacencies may be formed between two routers, where the first adjacency type listed in column three is relative to the particular router (e.g., self), and the second adjacency type is relative to the neighbor router (e.g., neighbor). For example, if self.level is greater than zero, both self.attribute.Leaf2LeafProcedures and neighbor.attribute.Leaf2LeafProcedures are false, and neighbor.level is one greater than self.level, then the neighbor is a northern neighbor of the particular router. As such, from the perspective of the particular router, the adjacency with the neighbor is an ascending adjacency, and from the perspective of the neighbor router, the adjacency with the particular router is a descending adjacency (i.e., "Ascending/Descending").

A Highest Adjacency Three Way (HAT) is the highest neighbor level of all the formed three-way adjacencies for a node. In some examples, a node starting with LEVEL_VALUE being 0 (i.e., the node assumes a leaf function or has a CONFIGURED_LEVEL of 0) may additionally compute HAT per procedures above but may not use this to compute DERIVED_LEVEL. HAT may be used to limit adjacency formation. In some examples, if Self level is greater than zero, neighbor.level is 0, neighbor.leaf procedure is any and adjacency formation is descending/ascending adjacency, the adjacency is formed if and only if the left node is HAT.

In addition, when a particular node has a derived level and does not have any adjacencies with nodes that are at a lower level, then that node may be configured to set its overload flag to indicate that it will not accept transit traffic. Further, a node that is supporting leaf-to-leaf procedures will not form any descending adjacencies, and therefore may also be configured to set its overload flag.

FIG. 5 is a block diagram illustrating a network topology graph 500 of an example data center network such as network 100 shown in FIG. 1. Graph 500 may be similar to graph 300 shown in FIG. 3. In some network topologies, it may be desirable to have lateral edges between leaf nodes. Further, it may be advantageous to limit adjacency formation in certain situations, as described above. In the example shown in FIG. 5, there is a lateral edge 502 connects leaf nodes L41 and L42. If both nodes L41 and L42 support leaf-to-leaf procedures, then both nodes L41, L42 would be set to self.level of 0, and the lateral edge 502 would be correctly established as a lateral adjacency (e.g., a bi-directional, east/west link) (as illustrated in FIG. 5).

However, if, for example, node L42 did not indicate support for leaf-2-leaf procedures, and does not set its self.level to 0, then node L42 may derive a level of 62 from its northern neighbors N411-N414. Further, if L41 does not indicate support for leaf-2-leaf procedures nor set its own self.level to 0, this would subsequently cause node L41 to potentially derive a level of 61 from node L42, thereby causing node L41 to believe it is at the same level as aggregation nodes N431-N434, and incorrectly form lateral adjacencies with nodes N431-N434 instead of ascending/descending adjacencies. Such an error may further cause node L42 to serve as transit for node L41 traffic, thereby potentially causing traffic flow problems.

If, on the other hand, node L41 did not indicate support for leaf-to-leaf procedures, but L42 did indicate support for leaf-to-leaf procedures (and thus is set to level 0), then L41 would derive its level as 60 (one less than nodes N431-N434), and L42 would set its level to 0. As such, descending/ascending adjacencies would be formed between L41 and L42, respectively.

Figure 6:
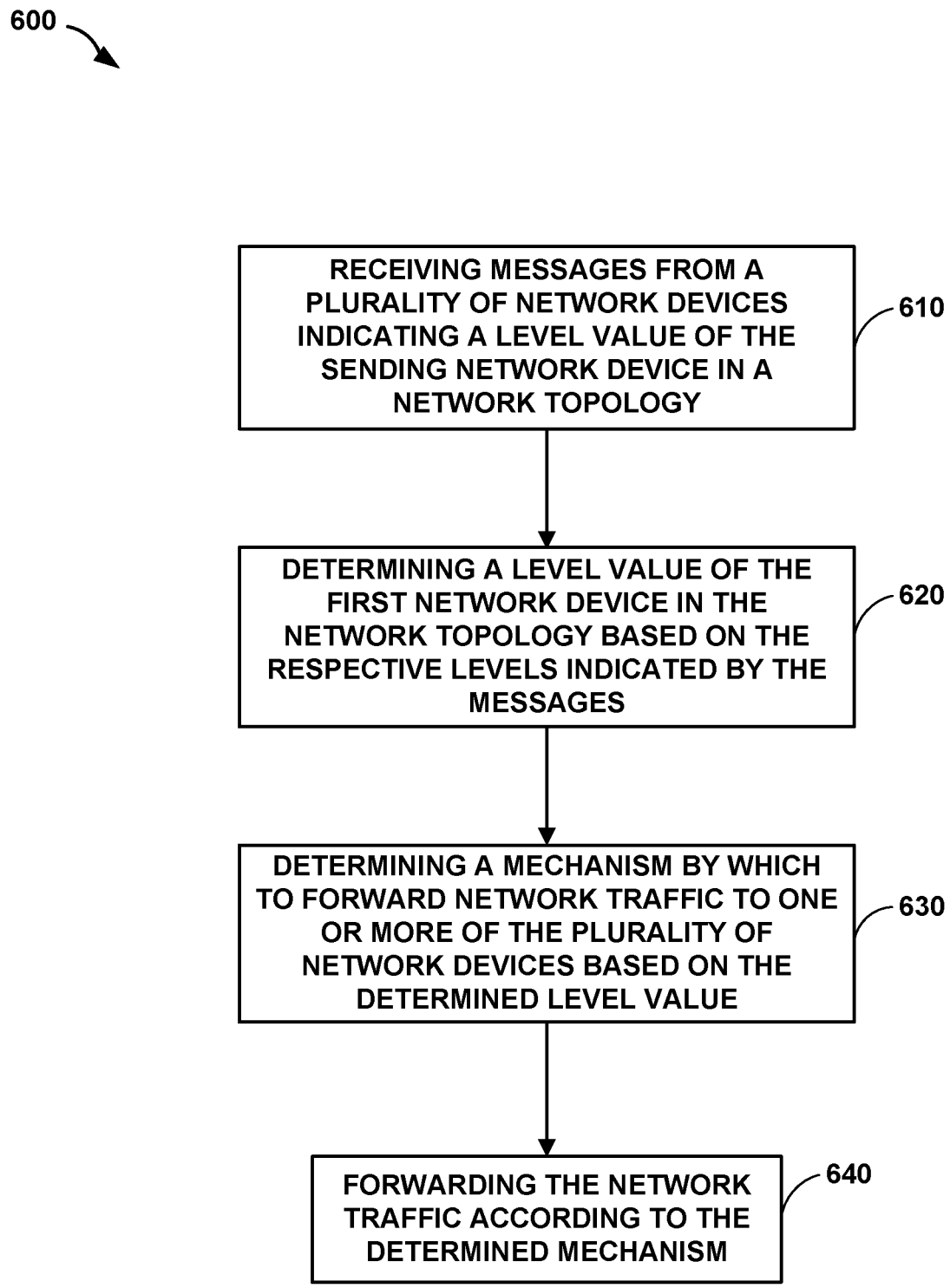
FIG. 6 is a flowchart illustrating an example method for automatically determining level information for network devices in a fabric according to the techniques of this disclosure.

FIG. 6 is a flowchart 600 illustrating an example method for automatically determining level information for network devices in a fabric 118 according to the techniques of this disclosure. The method of FIG. 6 is explained with respect to router 270 of FIG. 2. However, other network devices may perform this or a substantially similar method. Moreover, the steps of the method of FIG. 5 need not necessarily be performed in the order shown. That is, the steps may be performed in a different order, and some steps may be performed in parallel.

Initially, control plane 234A of router 270 receives messages from a plurality of network devices, each of the messages indicating a level value of the sending network device in a network topology (610). For example, the messages may be RIFT LIE messages sent from level determination process 280 executing on a neighbor node. Router 270 determines, based on the respective levels indicated by the messages, a level value of the first network device in the network topology (620). For example, level determination process 280 may include setting self.level of router 270 to one less than a neighbor's level, as described above. In some examples, determining a level of the router 270 further includes excluding from the determining any consideration of messages from leaf network devices. Router 270 also determines, based on the determined level, a mechanism by which to forward traffic to one or more of the plurality of network devices (630). For example, level determination process 280 may identify a neighbor as an ascending or higher-level neighbor, and thus may determine to pass link state information to that neighbor, or may identify that neighbor as a descending or lower-level neighbor, and thus may determine to pass distance vectors to that neighbor. Router 270 further forwards the network traffic according to the determined mechanism (640). For example, routing protocols 258 may subsequently pass link state information or distance vectors to neighbors based on the determined mechanism for each particular neighbor.

Router 270 may form an adjacency relationship with a second network device of the plurality of network devices based on a level of the second network device. Further, router 270 may break an existing adjacency relationship with a third network device based on forming the adjacency relationship with the second network device and further based on a level of the third network device, wherein the level of the third network device is lower than the level of the second network device.

Router 270 may also determine that a second network device of the plurality of network devices is at a level higher than the level of the first network device, and change the level of the router 270 to one less than the level of the second network device. For example, self level of router 270 may be stored as a part of router settings 282, or neighbor.level of the various neighbors of router 270 may be stored as a part of neighbor settings 284.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

Various examples have been described. These and other examples are within the scope of the following claims.

What is claimed is:

1. A method comprising:
receiving, by a first network device, messages from a plurality of network devices in a network, each of the messages indicating a level value of a respective sending network device in a network topology;
deriving, by the first network device and based on the respective level values indicated by the messages, a level value of the first network device in the network topology;
forming, by the first network device, an adjacency relationship with a second network device of the plurality of network devices based on a level value of the second network device;
breaking, by the first network device, an existing adjacency relationship with a third network device based on forming the adjacency relationship with the second network device and further based on a level value of the third network device, wherein the level value of the third network device is lower than the level value of the second network device;
in response to deriving the level value of the first network device, sharing the derived level value of the first network device with neighboring network devices;
determining, by the first network device and based on the derived level value, a mechanism by which to forward network traffic to one or more of the plurality of network devices; and
forwarding the network traffic according to the determined mechanism.

2. The method of claim 1, further comprising:
receiving a subsequent message from the second network device, the message indicating a level value of the second network device;
determining, by the first network device and based on the level value of the second network device indicated by the subsequent message, that the second network device of the plurality of network devices is at a level value higher than the level value of the first network device; and
in response to determining that the second network device is at the level value higher, changing the level value of the first network device to one less than the level value of the second network device.

3. The method of claim 1, wherein deriving the level value of the first network device further includes excluding any consideration of messages from leaf network devices during the deriving.

4. The method of claim 1, wherein the messages include Routing in Fat Trees (RIFT) link information element (LIE) messages.

5. The method of claim 1, wherein deriving the level value of the first network device further includes:
- a first determining that a neighbor level value is greater than zero;
- a second determining that one of (1) a self level value is unknown and (2) the self level value is known and less than the neighbor level value; and
- setting the level value to one less than the neighbor level value based on the first determining and the second determining.

6. The method of claim 1, wherein the mechanism includes one of passing link state information and passing distance vectors, wherein forwarding the network traffic further includes one of passing link state information to an ascending neighbor and passing distance vectors to a descending neighbor.

7. The method of claim 1, further comprising storing an indication that the first network device has a derived level value rather than a pre-determined level value.

8. The method of claim 1, wherein deriving the level value of the first network device comprises:
- deriving a highest available level by assuming the level value of the first network device is a lower level value compared to the respective level values indicated by any of the messages that are received from non-leaf network devices.

9. A first network device comprising:
- a plurality of network interfaces configured to be communicatively coupled to a plurality of network devices forming a network topology; and
- one or more processors comprising processing circuitry configured to:
  - receive messages from the plurality of network devices, each of the messages indicating a level value of a respective sending network device of the plurality of network devices;
  - derive, based on the respective level values indicated by the messages, a level value of the first network device in the network topology;
  - form an adjacency relationship with a second network device of the plurality of network devices based on a level value of the second network device;
  - break an existing adjacency relationship with a third network device based on forming the adjacency relationship with the second network device and further based on a level value of the third network device, wherein the level value of the third network device is lower than the level value of the second network device;
  - in response to deriving the level value of the first network device, share the derived level value of the first network device with neighboring network devices;
  - determine, based on the derived level value, a mechanism by which to forward network traffic to one or more of the plurality of network devices; and
  - forward the network traffic according to the determined mechanism.

10. The network device of claim 9, wherein the processing circuitry is configured to:
- receive a subsequent message from the second network device, the message indicating a level value of the second network device;
- determine, based on the level value of the second network device indicated by the subsequent message, that the second network device of the plurality of network devices is at a level value higher than the level value of the first network device; and
- in response to determining that the second network device is at the level value higher, change the level value of the first network device to one less than the level value of the second network device.

11. The network device of claim 9, wherein the processing circuitry is configured to derive the level value of the first network device at least in part by excluding any consideration of messages from leaf network devices during the deriving.

12. The network device of claim 9, wherein the messages include Routing in Fat Trees (RIFT) link information element (LIE) messages.

13. The network device of claim 9, wherein the processing circuitry is configured to derive the level value of the first network device at least in part by:
- a first determining that a neighbor level value is greater than zero;
- a second determining that one of (1) a self level value is unknown and (2) the self level value is known and less than the neighbor level value; and
- setting the level value to one less than the neighbor level value based on the first determining and the second determining.

14. The network device of claim 9, wherein the mechanism includes one of passing link state information and passing distance vectors, wherein the processing circuitry is configured to forward the network traffic by one of passing link state information to an ascending neighbor and passing distance vectors to a descending neighbor.

15. A computer-readable storage medium having stored thereon instructions that, when executed, cause a processor of a first network device to:
- receive, by the first network device, messages from a plurality of network devices in a network, each of the messages indicating a level value of a respective sending network device in a network topology;
- derive, by the first network device and based on the respective level values indicated by the messages, a level value of the first network device in the network topology;
- form an adjacency relationship with a second network device of the plurality of network devices based on a level value of the second network device;
- break an existing adjacency relationship with a third network device based on forming the adjacency relationship with the second network device and further based on a level value of the third network device, wherein the level value of the third network device is lower than the level value of the second network device;
- in response to deriving the level value of the first network device, share the derived level value of the first network device with neighboring network devices;
- determine, by the first network device and based on the derived level value, a mechanism by which to forward network traffic to one or more of the plurality of network devices; and
- forward the network traffic according to the determined mechanism.

* * * * *